United States Patent
Chassagne et al.

(10) Patent No.: US 12,486,787 B2
(45) Date of Patent: Dec. 2, 2025

(54) PRESSURIZATION OF A LUBRICATED TURBOMACHINE ENCLOSURE

(71) Applicants: SAFRAN AIRCRAFT ENGINES, Paris (FR); SAFRAN VENTILATION SYSTEMS, Blagnac (FR)

(72) Inventors: Amélie Argie Antoinette Chassagne, Moissy-Cramayel (FR); Vincent Christophe Brodbeck, Moissy-Cramayel (FR); Stéphane Petibon, Moissy-Cramayel (FR)

(73) Assignees: SAFRAN AIRCRAFT ENGINES, Paris (FR); SAFRAN VENTILATION SYSTEMS, Blagnac (FR)

( * ) Notice: Subject to any disclaimer, the term of this patent is extended or adjusted under 35 U.S.C. 154(b) by 0 days.

(21) Appl. No.: 18/712,415

(22) PCT Filed: Dec. 1, 2022

(86) PCT No.: PCT/FR2022/052218
§ 371 (c)(1),
(2) Date: May 22, 2024

(87) PCT Pub. No.: WO2023/099850
PCT Pub. Date: Jun. 8, 2023

(65) Prior Publication Data
US 2025/0012206 A1    Jan. 9, 2025

(30) Foreign Application Priority Data
Dec. 2, 2021    (FR) ........................................ 2112831

(51) Int. Cl.
*F01D 11/02*    (2006.01)
*F01D 25/18*    (2006.01)

(52) U.S. Cl.
CPC ............ *F01D 25/183* (2013.01); *F01D 11/02* (2013.01); *F05D 2260/98* (2013.01)

(58) Field of Classification Search
CPC .... F01D 25/183; F01D 11/02; F05D 2260/98; F02C 7/06
See application file for complete search history.

(56) References Cited

U.S. PATENT DOCUMENTS 4,709,545 A * 12/1987 Stevens ................. F01D 25/125
60/39.83
2005/0217272 A1* 10/2005 Sheridan ............... F04D 29/063
60/39.08
(Continued)

FOREIGN PATENT DOCUMENTS

EP    3 409 903 A1    9/2021
FR    2 698 406 A1    5/1994
(Continued)

OTHER PUBLICATIONS

France Search Report and Written Opinion mailed Jun. 20, 2022, issued in Application No. FR2112831, filed Dec. 2, 2021, 6 pages.
(Continued)

*Primary Examiner* — Steven M Sutherland
(74) *Attorney, Agent, or Firm* — CHRISTENSEN O'CONNOR JOHNSON KINDNESS PLLC

(57) ABSTRACT

A turbomachine includes an enclosure lubrication and pressurization assembly having at least one lubricated enclosure protected by two seals. The turbomachine further includes a primary flow path surrounding the at least one lubricated enclosure, and in which circulates a primary flow passing through at least one compressor of the turbomachine. The assembly further includes an electric compressor supplied
(Continued)

with air and connected to the at least one lubricated enclosure in order to introduce air under pressure into the enclosure through the seals.

9 Claims, 2 Drawing Sheets

(56) References Cited

U.S. PATENT DOCUMENTS

| | | | |
|---|---|---|---|
| 2013/0094937 A1* | 4/2013 | Glahn | F02C 6/08 |
| | | | 415/122.1 |
| 2013/0192253 A1 | 8/2013 | Ackermann et al. | |
| 2018/0149040 A1 | 5/2018 | Witlicki et al. | |

FOREIGN PATENT DOCUMENTS

| | | |
|---|---|---|
| FR | 3 021 067 A1 | 11/2015 |
| FR | 3 092 366 A1 | 8/2020 |

OTHER PUBLICATIONS

International Search Report mailed Mar. 31, 2023, issued in corresponding International Application No. PCT/FR2022/052218, filed Dec. 1, 2022, 5 pages.

Written Opinion mailed Mar. 31, 2023, issued in corresponding International Application No. PCT/FR2022/052218, filed Dec. 1, 2022, 4 pages.

* cited by examiner

PRESSURIZATION OF A LUBRICATED TURBOMACHINE ENCLOSURE

FIELD OF THE DISCLOSURE

The present document concerns the lubrication of rotating elements in a turbomachine, in particular the pressurization of lubricated enclosures comprising one or more rolling bearings of the turbomachine.

BACKGROUND

Prior art turbomachinery generally has bearings, also known as bearing housings, which are protected from the environment of other turbomachinery components by enclosures, known as bearing housings, which surround them.

Thus, FIG. 1 schematically represents a bearing enclosure 1 of the prior art, as described in document FR3021067. This bearing enclosure 1 allows a guiding bearing of a tubular shaft 8 to be sealed off from other parts of the turbomachine on either side of the bearing. The guiding bearing comprises a fixed outer ring 9 mounted on a fixed part 10 of the turbomachine, a rotating inner ring 11 mounted on the tubular shaft 8 and rolling elements 7. This arrangement can be reversed so that the inner ring is fixed and the outer ring is rotatable.

In order to ensure lubrication and cooling of the guiding bearing contained in the enclosure, it is necessary to inject a lubricant under pressure onto the moving parts 11 and/or 7. For this purpose, the bearing housing 1 has injection means 12, which generally comprise an inlet pipe 2 connected to a nozzle 3, which allow the lubricant to be sent under pressure to the rotating ring 11 and/or the rolling elements 7. The bearing enclosure 1 also has lubricant recovery means 5 for removing used lubricant.

In addition, in order to ensure the tightness of the bearing enclosure, this enclosure is closed by seals 14. Typically, seals 14 are labyrinth seals, i.e. frictionless seals with opposing reliefs creating cross-sectional reductions resulting in pressure differences across them. These large pressure differences make leaks more difficult, but do not eliminate them completely. However, it is important to prevent the oil from spreading outside the bearing housing 1, in order to avoid various disadvantages, such as coking or the risk of fire in a hot area of the engine, pollution of the engine and its surroundings, excessive oil consumption, bearing lubrication faults or the formation of a liquid imbalance.

For this purpose, pressurized air is injected into the bearing enclosure by air injection means 4, to ensure a sufficient pressure difference. This pressurized air is usually taken from downstream of a turbomachine compressor stage in the primary flow, specifically downstream of the turbomachine's low pressure compressor and upstream of the high pressure compressor. This sampling plane is called plane 25 and the pressure at this plane is called P25.

Thus, it is the pressure difference between upstream and downstream of the seals 14 that ensures the proper pressurization of the bearing chamber 1. If this gap is too small, then oil droplets in the vicinity of the seals are likely to leak through these seals 14. However, the pressure P25 varies according to the operating phases of the turbomachine, and is lower at low turbomachine speeds. Indeed, the pressurization air taken from plane 25 does not have enough pressure at low speed to counter the pressure in the enclosure, which is close to the ambient pressure thanks to the venting circuit.

To overcome this problem, an electrical suction system can be provided to depressurize the bearing enclosure, as described in FR3092366A1. As a known alternative to the prior art, this document also describes the use of a jet tube to depressurize the bearing enclosure 1, i.e. to suck out the oiled air present in the enclosure. However, the jet tube requires a primary flow of high pressure, usually taken from a plane, called plane 27, which is downstream of the high pressure compressor, to drive a secondary flow, coming from the bearing enclosure to be pressurized.

FR2698406 describes another alternative for pressurizing the enclosure, namely: the provision of two air bleed points to the bearing enclosure via a valve which is controlled to bleed air at plane 25, or to bleed air at plane 27 when the turbomachine is at low speed, to ensure sufficient pressurization of the bearing enclosure.

However, these solutions require sampling quite far from the bearing enclosure in the primary vein, which is costly in terms of performance and installation.

In addition, particularly when the lubricated enclosure is of the ventilated type and associated with an oil separator, the lubricating oil introduced into the bearing enclosure is generally recovered by a recovery pump and the air introduced into the enclosure is evacuated through a degassing tube to the oil separator and then to the outside. The oil separator recovers the oil from the oiled air and reintroduces it into the oil system. However, as the oil separator is not 100% efficient, a small proportion of the oil is not recovered by the oil separator and is lost to the atmosphere, accounting for most if not all of the engine's oil consumption. Generally, the greater the air flow rate, the greater the amount of oil lost, as the air acts as a vehicle for the oil in degassing the enclosure.

The pressure difference, between the upstream and downstream seals is often much greater than the pressurization requirement of the bearing chamber. This means that more air than necessary is introduced into the enclosure, resulting in greater oil loss.

This document aims to address these drawbacks.

SUMMARY

The present document proposes an enclosure lubrication and pressurization assembly for a turbomachine comprising at least one lubricated enclosure protected by two seals, the turbomachine further comprising a primary flow path surrounding the at least one lubricated enclosure, in which primary flow path passes through at least one compressor of the turbomachine, the assembly comprising an electric compressor supplied with air and connected to the at least one lubricated enclosure in order to introduce air under pressure into the enclosure through the seals.

The electric compressor allows the lubricated enclosure to be pressurized independently of the operating regime of the at least one compressor, thereby preventing coking of the oil in the lubricated enclosure and any leakage of oil from the lubricated enclosure. In addition, the speed of the electric compressor can be controlled to adjust the rate of pressurization of the lubricated enclosure to precise amount needed to prevent oil leakage through the seals. The pressure can be adjusted to remain constant across the lubricated enclosure regardless of the operating point of the turbomachine. The speed of the electric compressor can be controlled by a control box, for example according to the parameters of the turbomachine, such as the speed of the high-pressure body, known as the N2 speed, which allows to reduce power consumption. Adapting the air flow rate entering the lubricated enclosure reduces the oil consumption of the turbomachine, particularly when the lubricated enclosure is ventilated and associated with an oil separator. In fact, reducing the flow of air entering the enclosure allows the flow of air evacuated to the outside of the turbomachine by the oil separator to be reduced, which in turn reduces the oil consumption of the turbomachine for the reasons explained above.

The turbo machine may comprise a high pressure compressor and/or a low pressure compressor.

The electric compressor may be configured to introduce air into the at least one lubricated enclosure at a higher pressure than that in the at least one lubricated enclosure as required. In one embodiment, the turbomachine may comprise an inter-vein compartment bounded by an outer annular casing around which flows a secondary flow in a secondary vein of the turbomachine surrounding the primary vein, and by an inner annular casing in which flows the primary flow.

The electric compressor can be located in the inter-vein compartment or upstream of the inter-vein compartment. Thus, the electric compressor is located in a relatively cool area compared to the primary vein.

The electric compressor can be supplied with air from the secondary flow.

The turbomachine may comprise a cooling circuit, for cooling at least part of the at least one compressor. The cooling circuit can be configured to take air from the primary flow, in particular to take air downstream of the low pressure compressor and upstream of the high pressure compressor. The cooling circuit may be further configured to route the extracted air to the at least part of the at least one compressor. The at least one lubricated enclosure may comprise a rolling bearing. One of the seals can be arranged upstream of the lubricated enclosure and the other seal can be arranged downstream of the lubricated enclosure.

The lubricated enclosure may be closed at its upstream end by two longitudinally separated seals disposed in an upstream cavity into which pressurized air from the electric compressor is introduced, and at its downstream end by two longitudinally separated seals disposed in a downstream cavity into which pressurized air from the electric compressor is introduced.

The cooling circuit may be configured to direct the air taken in to the upstream cavity and/or to the downstream cavity.

The electric compressor can be configured to introduce pressurized air through the downstream seal of the upstream cavity and the upstream seal of the downstream cavity.

The assembly may comprise at least one oil supply pump configured to supply oil to the at least one lubricated enclosure and at least one air/oil separator connected to the at least one lubricated enclosure and configured to recover a mixture of air and oil introduced into the enclosure and separate the oil and air from the mixture.

According to one embodiment, the at least one compressor through which the primary flow passes may be a low pressure compressor. The assembly may comprise a first lubricated enclosure upstream of the low pressure compressor and a second lubricated enclosure downstream of the low pressure compressor. Only the second lubricated chamber can be connected to the electric compressor.

Of course, the first lubricated chamber and the second lubricated chamber can be pressurized by the electric compressor.

The assembly may comprise a plurality of lubricated enclosures, at least one of which may be pressurized by the electric compressor. All lubricated enclosures can be connected to a single electric compressor. Alternatively, the assembly may include an electric compressor for each lubricated enclosure.

According to one embodiment, the assembly may comprise a valve, in particular autonomous or piloted, for example in the form of an autonomous non-return valve, the valve being arranged in bypass of the electric compressor and configured to short-circuit the electric compressor when the pressure at an air intake in the secondary flow for the electric compressor is higher than a threshold. The threshold can be determined according to the characteristics of the turbomachine. With a valve in the form of a non-return valve, the valve is closed when the pressure downstream of the valve is higher than the pressure upstream, in which case the electric compressor ensures the pressurization of the lubricated enclosure. The valve may be configured to open when the pressure difference across the valve is greater than the determined threshold, thereby allowing air to be supplied to the at least one lubricated enclosure without using the electric compressor. If the valve is not an autonomous flap but a controlled device, its opening can be controlled by the engine control unit according to various acquisition parameters from which the pressure at the level of the air intake in the secondary flow can be estimated, and in particular according to the speed N2.

In one embodiment, means for supplying power to the electric compressor may be configured to interrupt the power supply when the valve is in an open position, short-circuiting the electric compressor.

The power supply to the electric compressor can be interrupted when the valve is open, so as to limit the consumption of the electric compressor. For example, the power supply to the electric compressor can be switched off or on with a time delay between the opening or closing of the valve and the switching off or on of the electric compressor, in order to maintain the pressure difference in the transient phase.

The at least one lubricated enclosure may comprise tubes passing through it and opening on either side, in particular along the longitudinal axis, outside the at least one lubricated enclosure, each tube opening at one of the seals of the at least one lubricated enclosure and being supplied with pressurized air by the electric compressor.

The assembly may include means for regulating the electric compressor to maintain a set pressure difference between an upstream and a downstream side of each seal. The pressure difference can be sized to provide just the right amount of pressure to ensure a flow of air through the seals to prevent oil leakage from the at least one lubricated enclosure to the outside.

The electric compressor control means may be configured to control an output of the electric compressor to achieve the determined pressure difference across the seals of the at least one lubricated enclosure.

One or more lubricated enclosures may be provided for different rotating rotors of the turbomachine, such as a fan of the turbomachine, a rotor of a compressor of the turbomachine, or a rotor of a turbine of the turbomachine.

The electric compressor may be connected to an electric motor electrically powered by a battery or generator or an internal electrical system of an aircraft comprising the turbomachine, provided in an aircraft comprising the turbomachine. The engine and/or battery or generator may be located in a relatively cool area of the turbomachine.

The present document relates to a turbomachine, in particular for an aircraft, comprising an assembly as mentioned above.

DETAILED DESCRIPTION

Figure 1:
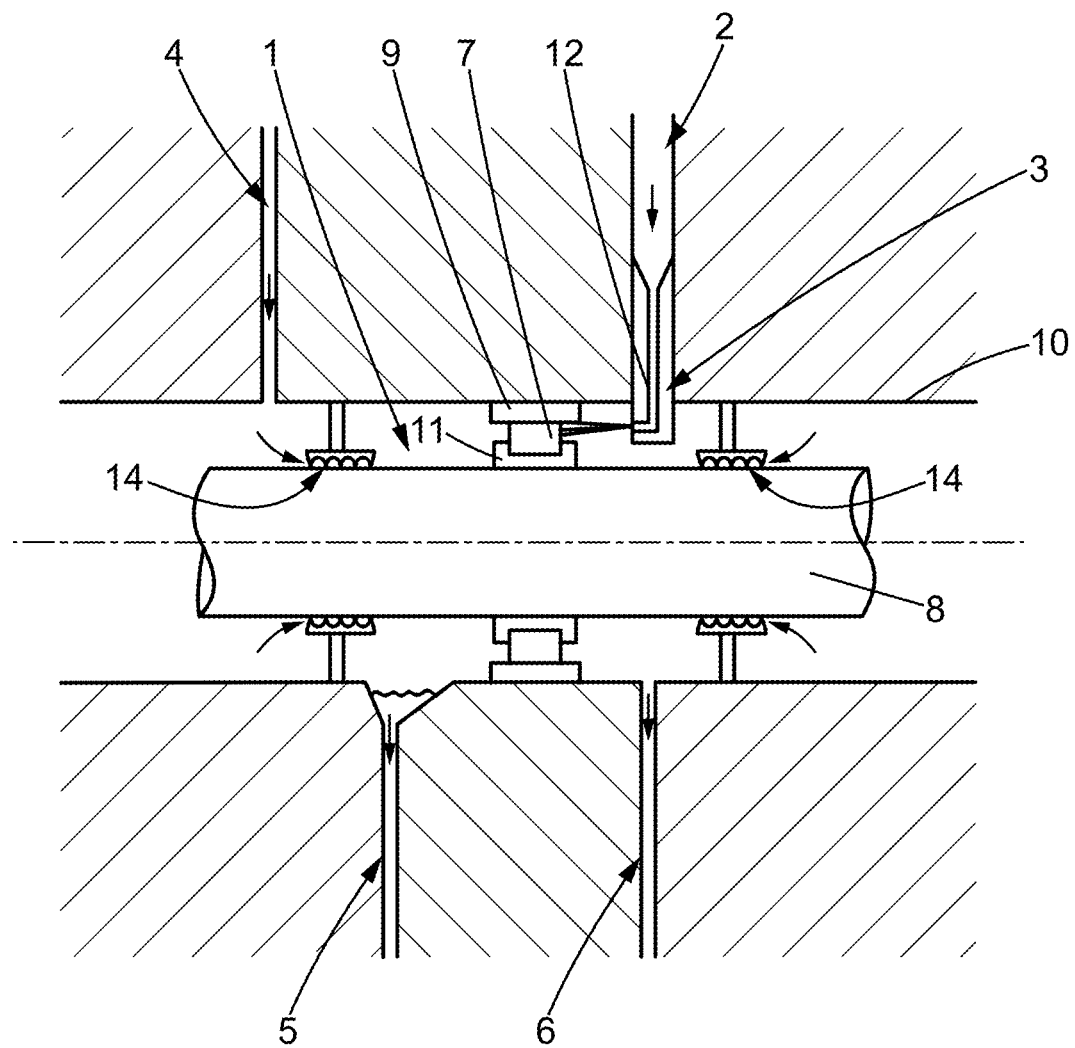
FIG. 1 shows a lubricated enclosure according to the prior art.
Figure 2:
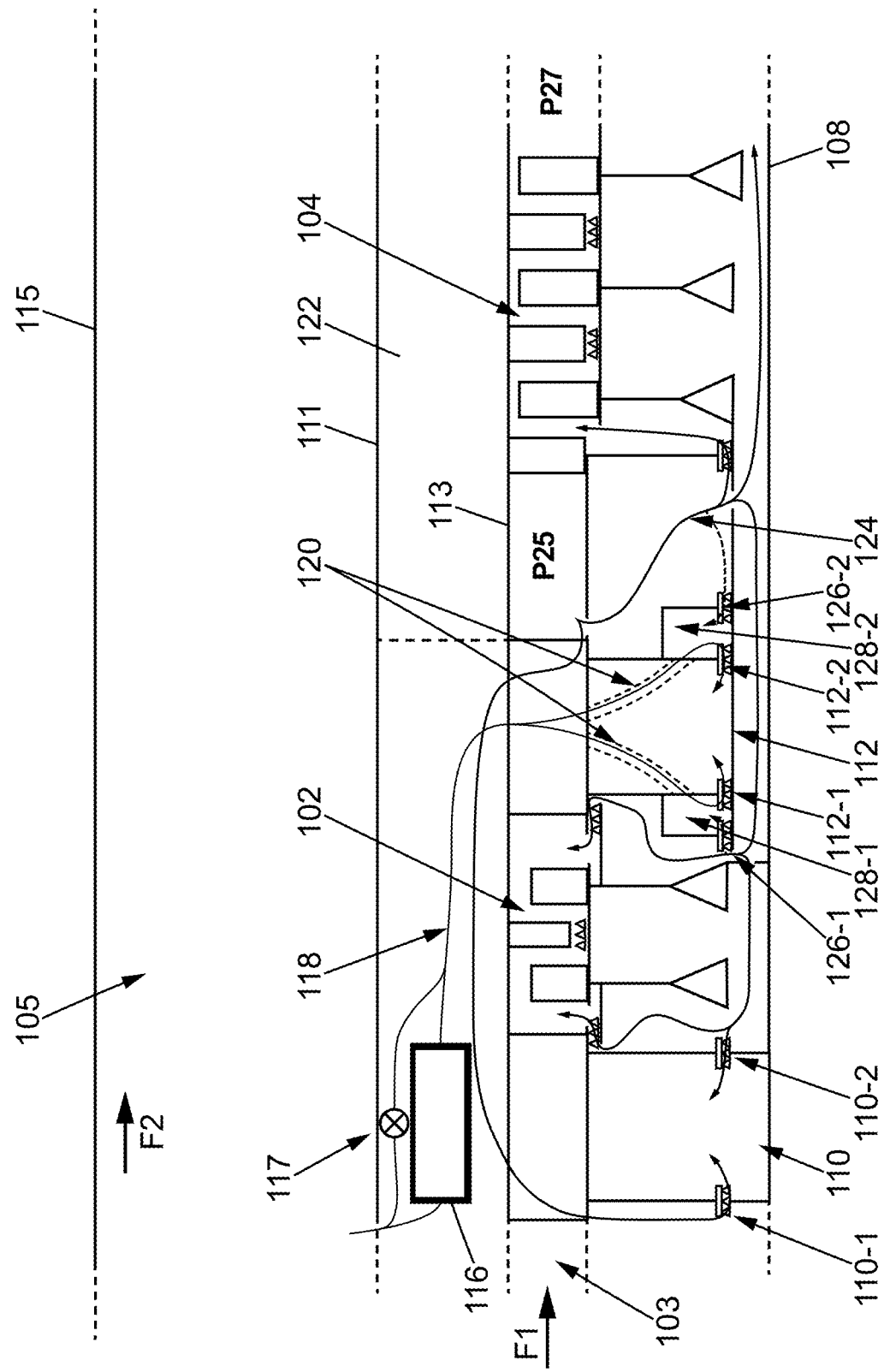
FIG. 2 shows schematically an upstream part of a turbomachine comprising a lubricated enclosure according to the present document.

FIG. 2 shows an upstream part of a double-flow turbomachine comprising, from upstream to downstream, along the direction of flow in the machine, a low-pressure compressor 102, a high-pressure compressor 104 rotating around a low-pressure shaft 108. The low-pressure 102 and high-pressure 104 compressors are arranged in a primary flow path 103, delimited by an internal intermediate casing 113, in which a primary flow F1 circulates. The turbomachine comprises a secondary flow path 105, delimited by an outer casing 115 and an outer intermediate casing 111, and in which a secondary flow F2 circulates, surrounding the primary flow path 103.

The turbomachine comprises a first lubricated enclosure 110 and a second lubricated enclosure 112. The first lubricated enclosure 110 comprises a rolling bearing and is sealed by an upstream seal 110-1 and a downstream seal 110-2. The second lubricated enclosure 112 comprises a rolling bearing and is sealed by an upstream seal 112-1 and a downstream seal 112-2.

The seals 110-1, 110-2, 112-1 and 112-2 are preferably labyrinth seals.

A lubricant, in particular oil, is injected into the lubricated enclosures 110 and 112 to cool the bearing of the lubricated enclosure 110 or 112.

To prevent lubricant leakage through the seals 112-1 and 112-2, pressurized air is injected into the lubricated enclosure 112.

For this purpose, the turbo machine comprises a motorized electric compressor which can be powered by an electrical circuit of the turbo machine. For example, the electric compressor 116 may comprise an electric motor powered by a battery or generator, independent of the turbomachine.

The electric compressor 116 is connected to the seals 112-1 and 112-2 by conduits 118, which pass through the lubricated enclosure by two tubes 120 arranged in the lubricated enclosure 112. These tubes may be external to the lubricated enclosure 112 so that the air bypasses the lubricated enclosure 112.

The electric compressor 116 compresses air taken from the secondary air stream 105 which is delivered through the conduits 118 to the seals 112-1 and 112-2, to provide a level of pressurization in the lubricated enclosure 112.

Thus, the electric compressor 116 allows the lubricated enclosure 112 to be pressurized independently of the operating speed of the turbomachine. The lubricated enclosure 112 is therefore more reliably sealed.

The electric compressor 116 is arranged in an inter-vein compartment 122 bounded by the inner intermediate casing 113 and the outer intermediate casing 111. The electric compressor 116 is arranged longitudinally at the high pressure compressor 102. Thus, the electric compressor 116 is located in a relatively cool area compared to the primary vein 103.

The turbomachine also includes a cooling circuit 124 for the bores of the high-pressure compressor or the low-pressure compressor by means of the so-called "bore cooling" effect. The cooling circuit 124 is configured to take air from plane 25 (P25), downstream of the low pressure compressor 102 and upstream of the high pressure compressor 104. The bleed air is conveyed through the cooling circuit 124 downstream under the high pressure compressor 104 and some of the bleed air escapes into the primary flow path 103 at the low pressure compressor 102 via tongues.

The cooling circuit 124 is further configured to supply air to the lubricated enclosure 110 for both cooling and pressurizing the lubricated enclosure 110.

To decouple the cooling circuit 124 from the air pressurized by the electric compressor 116, seals 126-1 and 126-2 are provided upstream and downstream of each seal 112-1 and 112-2, respectively, of the lubricated enclosure 122, thereby forming an upstream cavity 128-1 and a downstream cavity 128-2 on each side of the lubricated enclosure 112. When the turbomachine is operating at medium or high speed, the air taken from the plane 25 by the cooling circuit 124 may be at a higher pressure than the pressure supplied by the electric compressor and then enters the cavities 128 through the seals 126-1 and 126-2 which may not be perfectly tight. At low speed, on the other hand, the air flow in seals 126-1 and 126-2 will reverse, the pressure supplied by the electric compressor being higher than that of the air taken from plane 25. The seals 126-1 and 126-2 then create leakage lines, albeit relatively small ones, which are taken into account when adjusting the flow rate of the electric compressor so as to ensure a sufficient pressure difference at the seals 112-1 and 112-2 of the enclosure.

The turbomachine may further comprise a valve 117 arranged in bypass of the electric compressor 116 to bypass the compressor if the pressure in the secondary flow path, upstream of the compressor 116, is higher than a determined threshold which allows pressurization of the lubricated enclosure 112 without using the compressor. Preferably, the valve 117 is a non-return valve and allows pressurizing air to be supplied from the secondary duct (downstream of the fan) to the lubricated chamber 112 without the use of the compressor 116. The phases of aircraft flight in which the turbomachine thrust is close to full power are particularly suitable for the implementation of the compressor bypass 116, since the air pressure in the secondary flow is relatively high. As the power supply to the electric compressor is preferably interrupted while the valve 117 is open, this has the advantage not only of reducing the power consumption but also of possibly reducing the mechanical drawdown, typically on a drive shaft, by at least one electric generator supplying the power required by the electric compressor 116. Thus, the enclosure lubrication and pressurization assembly according to the disclosure does not affect the operability of the turbomachine, and in particular this operability is preserved even during flight phases requiring operation at high engine speed. In addition, in the event of a failure of the electric compressor 116, the pressurization of the enclosure remains assured thanks to the bypass of the compressor by operating the turbo machine above a certain engine speed, which is advantageous in terms of safety.

The turbomachine may further comprise an oil feed pump configured to feed oil to the lubricated enclosures 110 and 112.

The turbomachine may include an air/oil separator connected to the lubricated enclosures 110 and 112. The air/oil separator may be configured to recover a mixture of air and oil introduced into the lubricated enclosures 110 and 112 and separate the oil and air from the mixture.

The turbo machine can be modified so that the electric compressor 116 additionally pressurizes the lubricated enclosure 110. Alternatively, the turbomachine may comprise an additional electric compressor to pressurize the lubricated enclosure 110, independently of the lubricated enclosure 112.

The invention claimed is:

1. A turbomachine, comprising an enclosure lubrication and pressurization assembly having at least one lubricated enclosure protected by two seals a first upstream seal and a first downstream seal, said turbomachine further comprising a primary flow path surrounding the at least one lubricated enclosure in which circulates a primary flow (F1) passing through at least one compressor of said turbomachine, the enclosure lubrication and pressurization assembly including an electric compressor supplied with air and connected to the at least one lubricated enclosure so that the enclosure lubrification and pressurization assembly introduces air under pressure into said at least one lubricated enclosure through said first upstream seal and the first downstream seal, the electric compressor being configured to introduce air into the at least one lubricated enclosure at a higher pressure than that in the at least one lubricated enclosure as required; the turbomachine further comprising an inter-vein compartment delimited by an outer annular casing around which a secondary flow (F2) circulates in a secondary vein of the turbomachine surrounding a primary vein, and by an inner annular casing in which the primary flow (F1) circulates; and the turbomachine further comprising a valve arranged in bypass of the electric compressor and configured to bypass said electric compressor when a pressure at a secondary air bleed for said electric compressor is above a threshold.

2. The turbomachine according to claim 1, wherein the electric compressor is arranged in said inter-vein compartment.

3. The turbomachine according to claim 2, wherein the electric compressor is supplied with air taken from the secondary flow.

4. The turbomachine according to claim 1, further comprising a cooling circuit configured to cool at least part of said at least one compressor-and to draw air from the primary flow (F1) and to convey said air drawn from the primary flow to said at least part of said at least one compressor.

5. The turbomachine according to claim 4, wherein the at least one lubricated enclosure comprises a rolling bearing, said at least one lubricated enclosure being closed, on the one hand, at an upstream end of said at least one lubricated enclosure by the first upstream seal and a second upstream seal, the first and second upstream seals being longitudinally separated and disposed in an upstream cavity into which pressurized air from said electric compressor is introduced, and on the other hand at a downstream end of said at least one lubricated enclosure by the first downstream seal and a second downstream seal, the first and second downstream seals being longitudinally separated and disposed in a downstream cavity into which pressurized air from said electric compressor is introduced, and wherein the cooling circuit is configured to convey air taken from the primary flow (F1) to said upstream cavity and/or to said downstream cavity.

6. The turbomachine according to claim 4, wherein the at least one compressor through which the primary flow (F1) passes is a low-pressure compressor, said enclosure lubrification and pressurization assembly comprising a first lubricated enclosure of the at least one lubricated enclosure upstream of the low-pressure compressor and a second lubricated enclosure of the at least one lubricated enclosure downstream of the low-pressure compressor, and in which only the second lubricated enclosure is connected to the electric compressor.

7. The turbomachine according to claim 1, wherein the at least one lubricated enclosure comprises a rolling bearing, said at least one lubricated enclosure being closed, on the one hand, at an upstream end of said at least one lubricated enclosure by the first upstream seal and a second upstream seal, the first and second upstream seals being longitudinally separated and disposed in an upstream cavity into which pressurized air from said electric compressor is introduced, and on the other hand at a downstream end of said at least one lubricated enclosure by the first downstream seal and a second downstream seal, the first and second downstream seals being longitudinally separated and disposed in a downstream cavity into which pressurized air from said electric compressor is introduced.

8. The turbomachine according to claim 1, wherein the at least one lubricated enclosure comprises tubes passing therethrough and opening on either side outside said at least one lubricated enclosure, each tube opening at one of the first upstream seal and the second upstream seal and being supplied with pressurized air by the electric compressor.

9. The turbomachine according to claim 1, wherein means for supplying power to the electric compressor are configured to interrupt said means for supplying power when the valve is in an open position, short-circuiting said electric compressor.

* * * * *